United States Patent [19]

Hepler et al.

[11] Patent Number: 5,139,822
[45] Date of Patent: Aug. 18, 1992

[54] METHOD FOR COATING SOLDER ON SELECTIVE AREAS OF A METAL STRIP

[75] Inventors: Don R. Hepler; Jacques J. Hilhorst, both of Greensboro, N.C.

[73] Assignee: AMP Incorporated, Harrisburg, Pa.

[21] Appl. No.: 570,255

[22] Filed: Aug. 20, 1990

[51] Int. Cl.⁵ .......................... B05D 5/12; B05D 1/28
[52] U.S. Cl. .................................... 427/210; 427/123;
427/211; 427/287
[58] Field of Search ............... 427/123, 125, 287, 289, 427/293, 210, 211, 434.3; 118/DIG. 2

[56] References Cited

U.S. PATENT DOCUMENTS

| | | | |
|---|---|---|---|
| 2,937,108 | 5/1960 | Toye | 427/211 |
| 3,006,318 | 10/1961 | Monroe, Jr. et al. | 118/217 |
| 4,836,131 | 6/1989 | Kataoka | 118/220 |

*Primary Examiner*—Evan Lawrence
*Attorney, Agent, or Firm*—Katherine A. Nelson

[57] ABSTRACT

A method for applying solder (S) to selective areas of a metal strip (24), wherein the strip (24) is passed between rollers (36, 38) driven through a source of molten solder (40, 42) to transfer a coating a solder (S) to the strip (24). The rollers include discontinuous surfaces (37, 39) suitably shaped to provide selective areas of solder coating (S) on the strip (24).

5 Claims, 3 Drawing Sheets

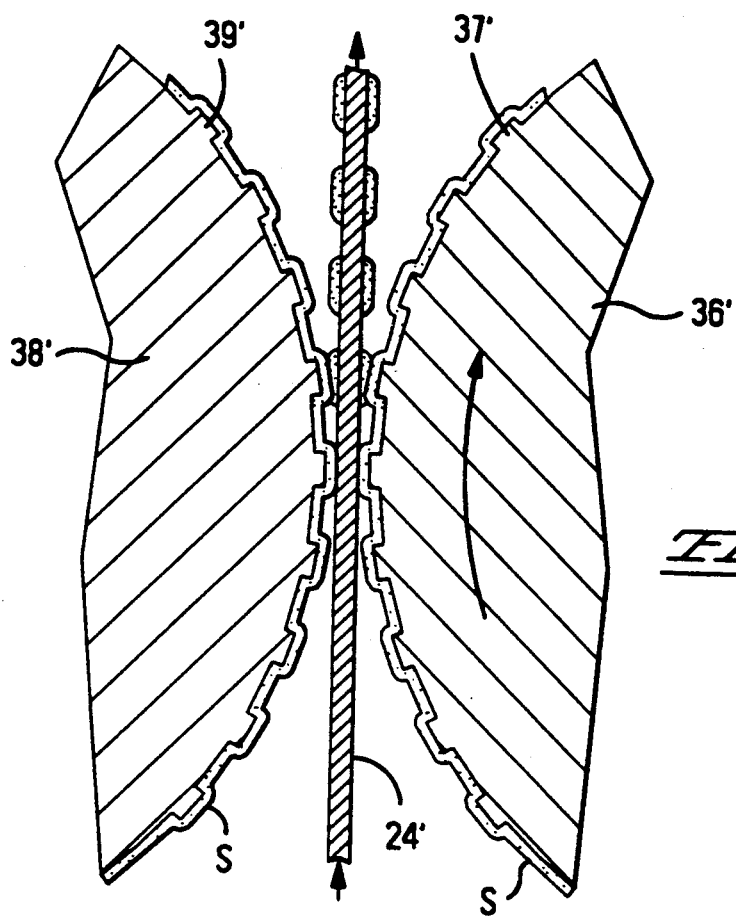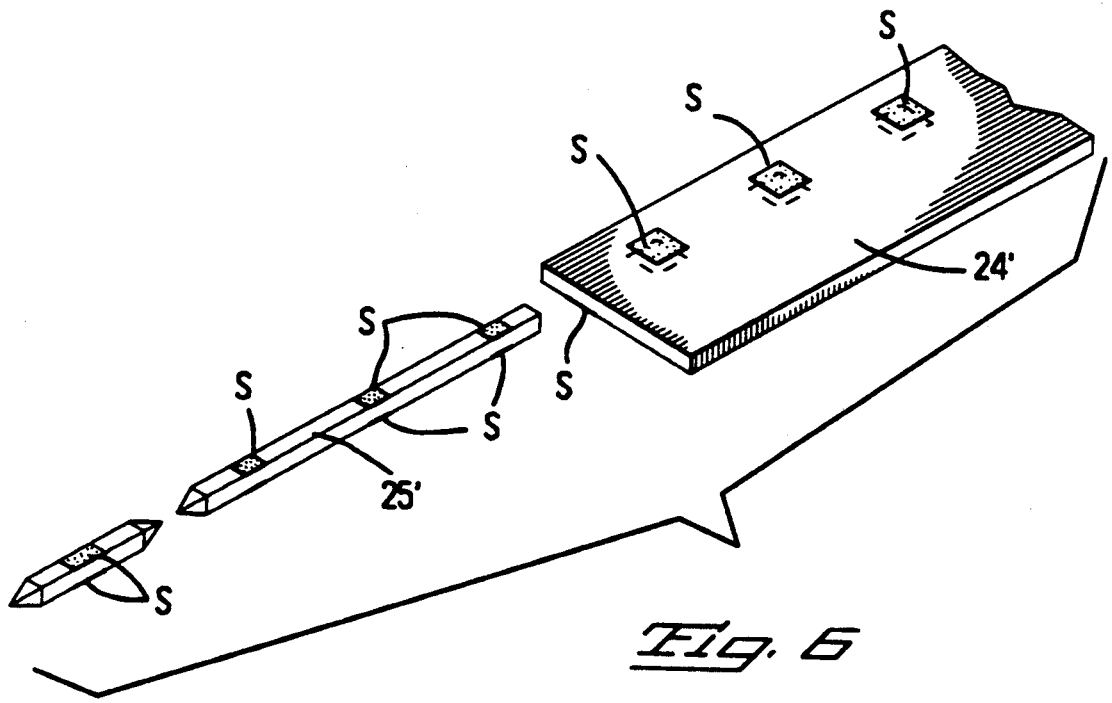

METHOD FOR COATING SOLDER ON SELECTIVE AREAS OF A METAL STRIP

This invention relates to a method and apparatus for solder coating metal articles such as electrical connectors or strip therefor.

BACKGROUND OF THE INVENTION

Electronic packaging utilizes stamped and formed terminals such as posts, pins, sockets, and the like fitted into the holes of printed circuit boards and soldered thereto as a principal means of interconnection. It is common practice to provide solder on such terminals by means of electrodeposition or a coating of molten solder, which is then reflowed by the application of heat to the terminals after they have been mounted to the board. The resulting reflowed solder electrically and mechanically fixes the terminals to the board, the solder flowing into engagement with circuit traces in or on the board. With respect to many designs, there is a need for substantial quantity of solder and, therefore, for a substantial thickness of solder placed on the terminal. With respect to many applications, the purer the solder alloy in terms of the presence of organic compounds therein, the better the solder with respect to long-term reliability.

Methods and apparatus for applying solder coating to conductive surfaces are well-known. U.S. Pat. No. 3,006,318 granted Oct. 31, 1961 to an apparatus for applying solder coating to surfaces teaches the use of a pair of rollers which are immersed in solder baths and spaced apart to receive a printed circuit board passed therebetween with the rollers transferring molten solder from the bath to coat the printed circuit board. Differentiation for selectivity of solder application is provided by virtue of the conductive printed circuits which are etched out on a non-conductive board material. Fluxing is provided by brushes positioned above the rollers to engage the printed circuit board in its downward travel through the rollers.

U.S. Pat. No. 4,836,131 granted Jun. 6, 1989 for a solder coating apparatus teaches the use of rollers for applying liquid solder to opposite sides of the leads of a lead frame having integrated circuit devices thereon. The solder bath is disposed below the roller assembly with the lead frames passed upwardly through the nip of the rollers. This patent teaches the use of rollers that squeeze the lead section between the rollers and apply a uniform coating of solder to opposite sides of the lead frame without causing a bridging of solder between the leads. With respect to Patent 4,836,131, the lead frames are run through the soldering apparatus twice to coat the leads on the four sides of the integrated circuit package.

It is an object of the present invention to provide an improvement through method and apparatus for solder coating electrical terminals with respect to speed of application, evenness of application, and control of thickness.

It is a further object of the invention to provide an improved method and apparatus for solder coating of electrical terminals in continuous strip form and on both sides of the terminal strip simultaneously.

It is yet a further object to provide a novel method of solder coating and an apparatus therefor that is simple, reliable, and suitable for high-volume production.

SUMMARY OF THE INVENTION

The present invention embraces a method and apparatus which features a continuous strip of metal material either before stamping and forming or thereafter which is fed through a series of rollers from a supply reel to a take-up reel. A first roller station for applying flux to both sides of the strip is located along a straight line portion of the length of moving strip. This station is comprised of a pair of rollers mounted to engage the strip on either side and to pass through reservoirs of flux to thereby coat the strip continuously as it is displaced. A second pair of rollers are provided downstream of the flux application station and which are rotated through molten solder so that their surfaces are coated therewith. These rollers are adjustable relatively toward and away from the strip and are made to have discontinuous surfaces defining the areas to be coated on the strip. The discontinuous areas may include one or more projections, discontinuous in either a peripheral sense or in the sense of a series of surfaces of different radius on the periphery of the rollers. The adjustment of the rollers is made in accordance with the invention to cause the surfaces to carry a meniscus of solder into engagement with the strip on either side to thus transfer solder selectively to the strip without a squeezing bearing relationship to the strip.

A frame is provided to fix the rollers in position and hold the flux and solder stations relative to strip movement. Means are provided to adjust the various rollers relative to both flux and solder immersion and a method embraces control of the strip movement and roller displacement to preclude slippage relative to strip movement and to control solder coating thickness.

BRIEF DESCRIPTION OF THE DRAWING

FIG. 5 is a side and elevational and partial view of an alternative embodiment of the solder rollers, solder meniscus and terminal strip.

FIG. 6 is a schematic and perspective view of terminals as coated with solder through the use of the rollers shown in FIG. 5.

DETAILED DESCRIPTION OF THE INVENTION

Figure 1:
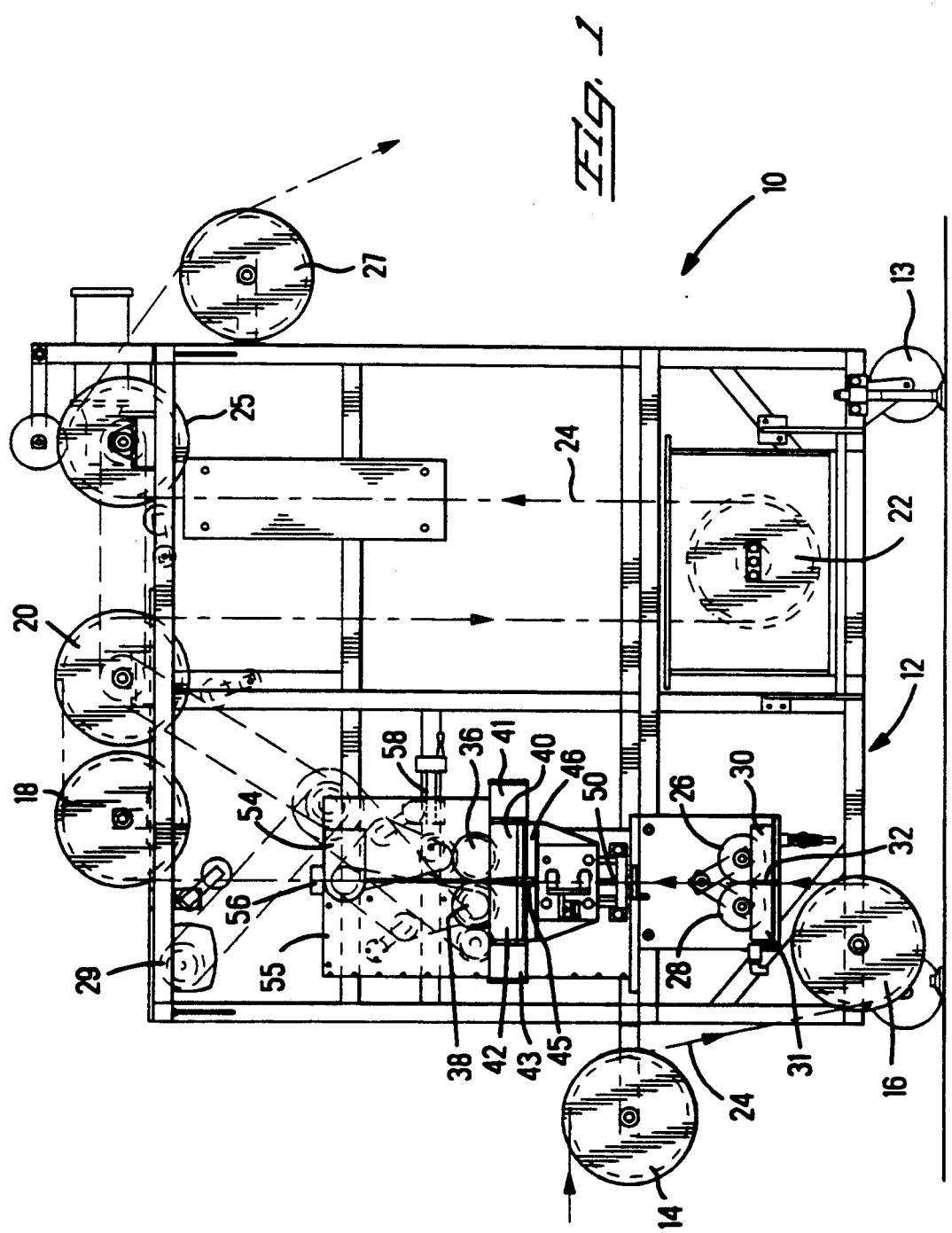
FIG. 1 is a vertical, elevational view of a solder coating apparatus in accordance with the invention.

Referring now to FIG. 1, an apparatus 10 is shown to include a frame 12 which may be assembled from metal bar stock. The frame 12 includes a series of rollers mounted thereon which facilitate displacement and transport of a strip to be solder coated. To the left in FIG. 1 is a first roller 14 which receives the strip 24 from a supply reel, not shown, and directs such strip to a further roller 16 positioned to direct the strip upwardly, vertically past fluxing and solder stations to a roller 18. Thereafter, the strip passes over a roller 20 and downwardly around a roller 22, upwardly again to a roller 25, and thence to roller 27 and on to a take-up reel, not shown. The rollers 14, 16, 18, 22, and 27 are typically undriven and free to rotate by virtue of engagement with strip 24. The rollers 20 and 25 are preferably driven by belts attached to a motor such as that shown as 29 which additionally provides a roller drive for the solder station in a manner to be described. The motor 29 is suitable controlled in terms of speed of rotation by a suitable electronic control, not shown.

It is to be understood that the frame 12 includes a box-like structure so as to be free-standing and the frame may be made portable by the use of wheels as at 13 so as to be positioned at a selected point in a manufacturing production line.

Figure 4:
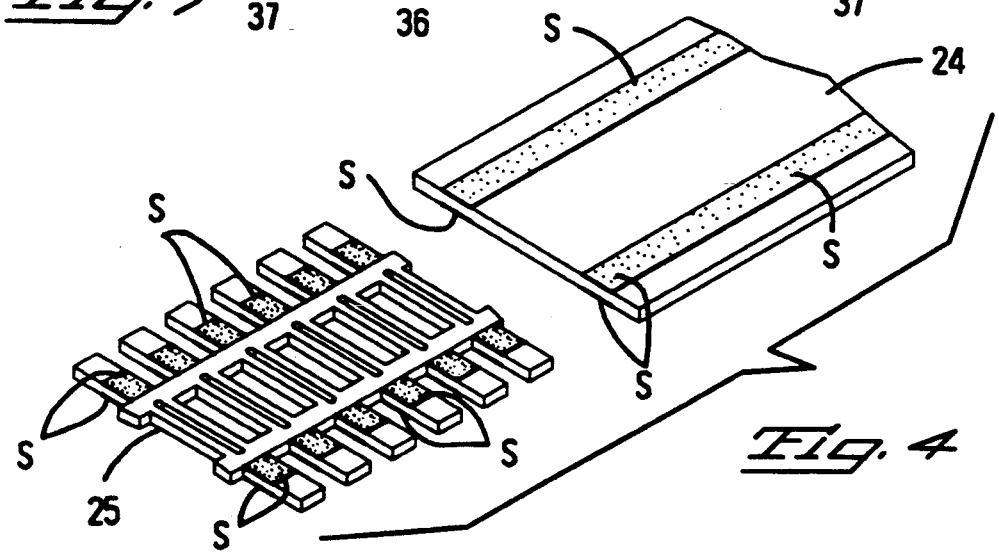
FIG. 4 is a schematic perspective view of terminal strips of the type coated by the present invention method and apparatus.

Referring again to FIG. 1, the strip 24 as it emerges from engagement with roller 16 is passed between a pair of flux reservoirs 30 and 31 in a space shown as 32 and through a pair of rollers 26 and 28 which engage strip 24 on either side thereof. The roller surfaces are configured to engage strip 24 at selected locations to provide flux only in the desired surface areas of strip 24. Representative patterns for flux and solder strip 24 are shown in FIGS. 4 and 6. The reservoirs 30 and 31 are made to contain a suitable flux for the particular type of solder being employed and for the particular metal alloy of strip 24. The level of flux is preferably adjusted through the use of a valve and flux level sensing means. The rollers 26 and 28 are made to extend down into the respective reservoirs to pick up flux as they rotate. The rollers are made to be adjustable in terms of bearing engagement with strip 24 with their engagement being adjusted to coat the strip 24 on either side with flux with minimum frictional drag.

Directly above the fluxing station is the solder station which includes a pair of solder reservoirs 40 and 42, each including a heater unit such as the calrod units 41 and 43 which extend within the reservoirs to maintain the solder in a liquid molten state. In practice, the solder should be maintained well above its melting point so as to remain molten despite heat loss to the strip and to the rollers and surrounding environment. A temperature on the order of in excess of 500 degrees Fahrenheit is preferred with respect to the molten solder in reservoirs 40 and 42. As can be discerned from FIG. 1, the rollers 36 and 38 extend into the reservoirs 40 and 42 to pass through the molten solder and be coated thereby. The surfaces of these rollers are also configured in a manner to apply solder over the fluxed areas of strip 24. Rollers 36,38 are driven to rotate in opposite directions upwardly and out of the reservoir by belts and/or suitable other rotary linkages tied to motor 29. It is preferred that slippage as between all of the transport and flux and solder rollers be minimized so that effectively all rollers turn at a constant rate.

The reservoirs 40 and 42 are affixed to a platform 46 which is made vertically adjustable by a suitable mechanism shown as 50 in order to set the level of penetration of the rollers 36 and 38 within the molten solder of the reservoirs.

The rollers 36 and 38 are mounted via axles on a pair of plates 54 and 55, plate 55 being attached to frame 12 and plate 54 being connected to plate 55 by hinge 56 to facilitate rotation of plate 54. This rotation facilitates setting the spacing between rollers 36 and 38 and a suitable mechanism shown as 58 is provided for this purpose. The necessary movement is indicated in an exaggerated fashion by the phantom line as shown proximate to plate 54. This movement facilitates control of the engagement of the roller surfaces with the strip 24 as it moves through space 45 between rollers 36,38.

In accordance with a preferred embodiment of the invention, the rollers are fabricated of low-carbon steel, machined to a finish on the order of 32 to 63 micro inches. The rollers are immersed in the solder to a depth of on the order of 20 to 30 percent of the radius of the roller. Preferably, at the conjunction of the roller side and the surface of the solder, a doctor blade is provided on each side thereof to minimize solder presence on the roller sides. Additionally, a blanket of material is floated on top of the solder to minimize the formation of films, dross, and other products of solder melting. This blanket may be formed of a material such as Fuscote RS2 supplied by London Chemical Company of Bensenville, Ill. 60106. A blanket on the order of ¼ inch in thickness operates to preclude the pick-up of dross onto the roller surfaces in addition to suppressing the formation thereof. While the invention contemplates application with a number of solders and strip alloys, a typical tin leaded solder, 93/7 or 60/40 may be employed to terminal alloys of brass, phosphor bronze, beryllium copper, and various other copper-based alloys.

In operation, the apparatus 10 takes a strip 24 that is suitably pre-cleaned and passes it through the transport and displacement mechanism of the apparatus via the various rollers to first flux and then solder coat the strip at 32,45 respectively. Thereafter, the strip may be rinsed, air dried and passed on to a take-up reel for further processing. The frame 12 may include rinsing and drying stations, not shown, and additionally an appropriate slack adjustment by movement of one or more of the rollers such as 22. Variables involved in solder coating, given a particular alloy and a particular choice of flux and solder include the speed of displacement of strip and rollers, the heat of the molten solder, and the pressure applied by rollers 36 and 38.

Figure 2:
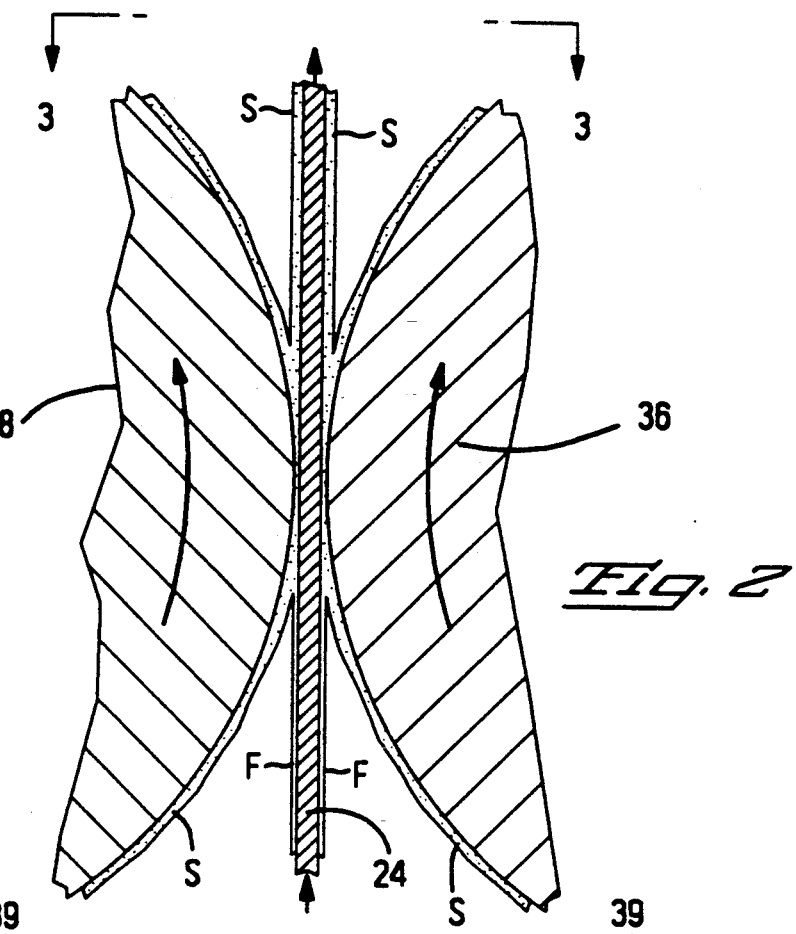
FIG. 2 is a side elevational and partial view of the solder coating rollers, the solder meniscus in engagement with a strip to be coated thereby.
Figure 3:
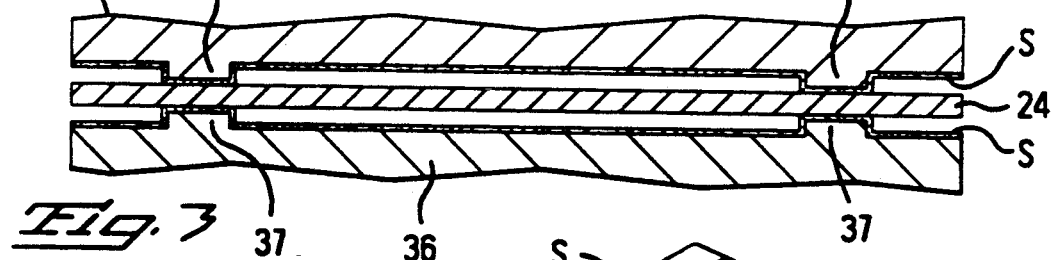
FIG. 3 is a partial view showing in section the roller, solder meniscus, and strip engagement.

FIG. 2 shows the sides of strip 24 having layer of flux F thereon, in contact with a solder coating S on each of the rollers 36 and 38. As can be discerned, the strip is solder coated on both sides through an engagement with solder coatings S on each of the rollers, the meniscus of S just touching the surfaces of strip 24. In accordance with the invention, the rollers are adjusted so as to be in essentially nonbearing relationship with respect to the strip 24, the meniscus serving to transfer solder to the strip. Thus as the rollers are rotated through the solder bath to result in the coatings S, transported upwardly with the meniscus thereof then engaging the strip. FIG. 3 shows this engagement in section and reveals a further aspect of the invention with respect to a strip 24, which, as is shown in FIG. 4, is a strip of thin metal stock, essentially unstamped and formed and including a coating S on each side that is discontinuous in a sense transverse to the length of the strip 24. FIG. 4 also shows a strip 25 which has been stamped and formed to define a series of terminals having legs protruding therefrom, each of which is solder coated as at S through the use of the method and apparatus of the invention. In FIG. 3, the discontinuous portion of rollers 36 and 38 is shown through projections 37 and 39 which carry the meniscus which coats the strip. Again, as a preferred aspect of the invention, the rollers are adjusted so that there is a nonbearing relationship with respect to the strip 24, the meniscus effecting solder transfer.

FIGS. 5 and 6 show an alternative embodiment of the invention wherein rollers 36' and 38' are made to include a series of projections 37' and 39' which define a series of small areas to selectively coat a terminal strip The projections 37' and 39' define surfaces of the rollers which are discontinuous around the periphery of the rollers. For purposes of illustration the flux layer is not shown on strip 24'. FIG. 6 shows the selective areas containing solder coatings S on a strip 24' and further on a strip 25' which is preformed in the form of a rectangular post subsequently stamped and formed following solder coating into the loose piece configuration shown to the bottom of FIG. 6. It is contemplated that a wide variety of terminals in the forms heretofore mentioned may be utilized with a method and apparatus of the invention both in the unstamped and formed condition and in the partially stamped and formed condition, connected together of course until after solder coating.

As can be seen in FIG. 5, the strip is passed upwardly vertically between the rollers with the areas of the projections 37' and 39' effecting a series of solder coatings. It has been found that solder definition can be readily maintained to a tolerance of on the order of between 0.005 and 0.010 thousandths of an inch.

As a practical matter, given a given alloy, flux, and solder, and once the spacing between the rollers is adjusted, solder coating thickness may be controlled by controlling the speed of displacement of the strip. We have discovered that strip displacement speeds on the order of between 15 and 30 feet per minute may be achieved, controlling the coating thickness from between on the order of 0.0005 to 0.003 thousandths of an inch, thicknesses quite adequate for most electrical terminals that given a constancy of other parameters, increasing the speed of strip displacement increases the thickness of solder coating and decreasing the speed of strip displacement decreases the thickness of solder coating. This is believed to be a function of heat transfer wherein the relatively cooler strip associated with higher speeds allows a thicker coating thereon.

The invention contemplates the addition of means not shown to preheat strip 24 and thus add a further control dimension to the method and apparatus of the dimension. Such a preheat could be provided utilizing calrod units and blowers between rollers 14 and 16 as an example.

Having now described and disclosed the invention in terms intended to enable a preferred practice of the method and apparatus thereof, we set forth what is deemed inventive in the appended claims.

We claim:

1. A method for selectively coating solder on selective areas of a metal strip, the steps comprising:
   a. displacing a strip to be coated along a line,
   b. providing a pair of rollers between which said strip is displaced positioned essentially tangentially to said strip along a said line,
   c. providing each of said rollers with a discontinuous surface of an area equal to the selective area to be coated,
   d. passing said roller surfaces through molten solder to coat said surface with solder in meniscus form,
   e. adjusting the spacing between said rollers to position said surfaces thereof in non-bearing relationship to each other and to said strip with the meniscus of each said surface touching said strip to coat the selective areas thereof, and
   f. adjusting the rates of strip displacement and roller rotation to control the thickness of said coating on said strip.

2. The method of claim 1 wherein said provision of discontinuous surfaces comprises surfaces continuous around the roller periphery and of a width less than the width of the rollers.

3. The method of claim 1 wherein said provision of discontinuous surfaces comprises surfaces discontinuous around the periphery of said rollers.

4. A method of high-speed coating of a metal strip selectively in areas thereon, the steps comprising:
   a. displacing a strip to be coated along a line at a given rate of movement,
   b. providing a first pair of rollers between which said strip is displaced essentially tangentially to said line,
   c. providing a source of flux and rotating said rollers therethrough to coat said strip with flux,
   d. providing a second pair of rollers between which said strip bearing flux is displaced essentially tangentially to said line with each said roller having a discontinuous surface defining selective areas equal to the selective areas sought to be coated,
   e. passing said second set of rollers through a source of molten solder to coat the selective areas of said rollers,
   f. adjusting the position of said second set of rollers to a relationship relative to each other and to said strip whereby said solder coating on said roller touches said strip and coats the selective areas thereon and,
   g. adjusting said rate of displacement of said strip to control coating thickness on said strip.

5. The method of claim 4 wherein the said roller surfaces are defined by a series of projections extending around the periphery of said rollers with said projections of each roller aligned relative to said strip and the areas sought to be coated.

* * * * *